Sept. 26, 1972   E. A. ROY ET AL   3,694,146
FORMALDEHYDE GAS GENERATOR/DISSEMINATOR
Filed Jan. 25, 1971
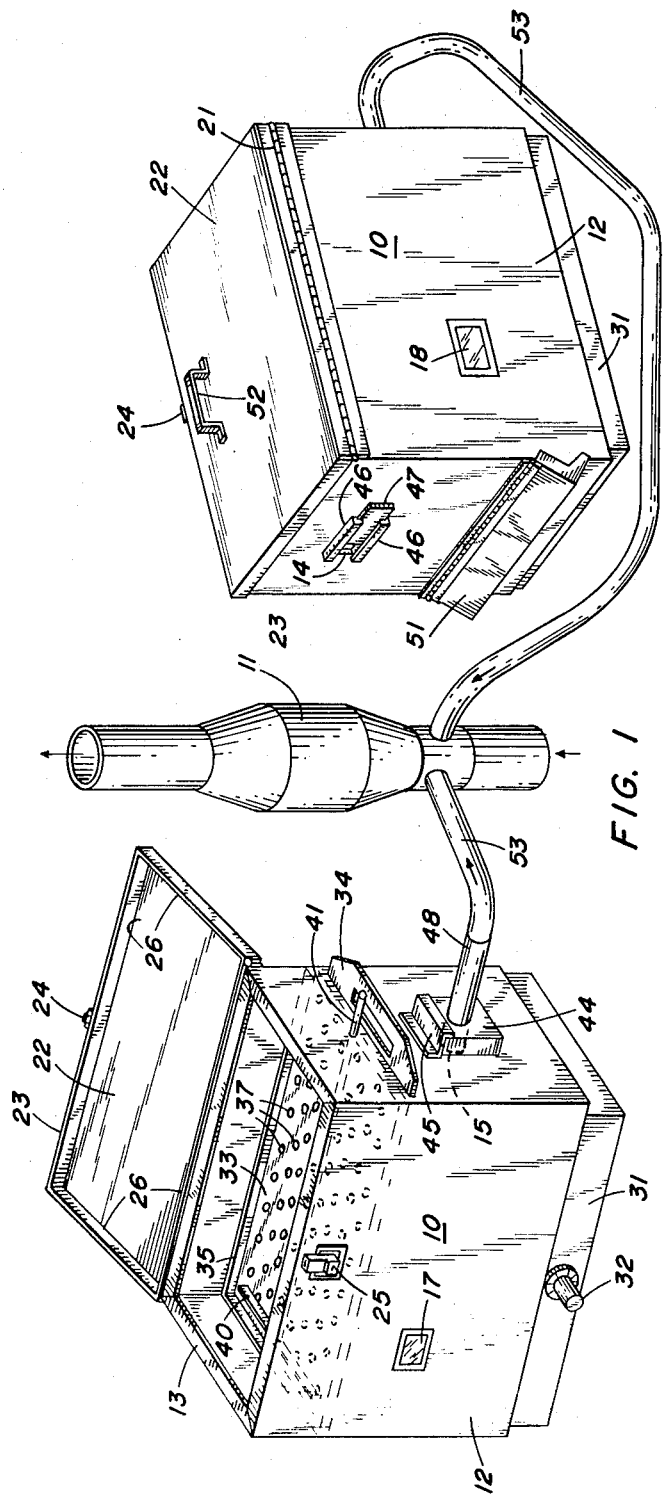
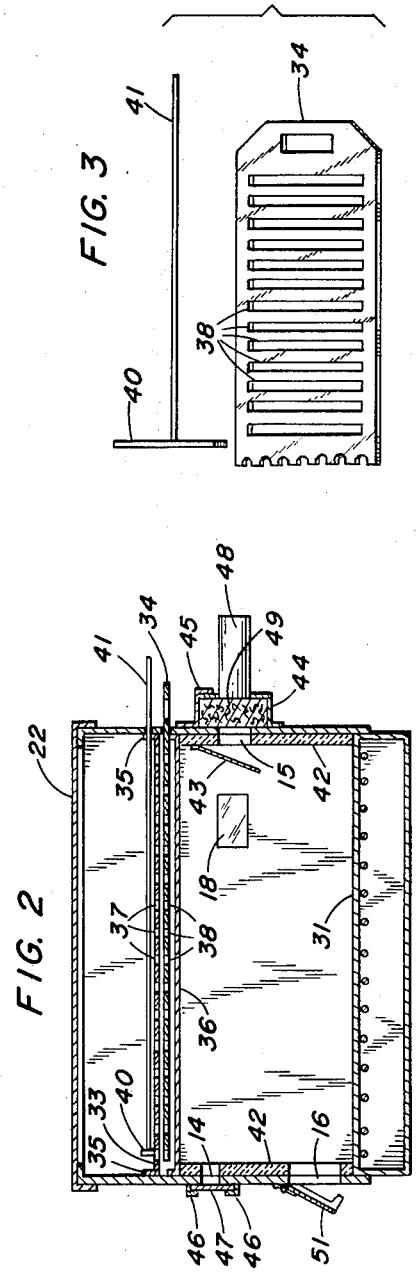
INVENTORS
HERBERT G. ARM
JAMES C. COOLBAUGH
WAYNE D. NORRIS
EDMOND A. ROY
BY
AGENT
ATTORNEY

United States Patent Office 3,694,146
Patented Sept. 26, 1972

3,694,146
FORMALDEHYDE GAS GENERATOR/ DISSEMINATOR
Edmond A. Roy, James C. Coolbaugh, Wayne D. Norris, and Herbert G. Arm, United States Navy, assignors to the United States of America as represented by the Secretary of the Navy
Filed Jan. 25, 1971, Ser. No. 109,286
Int. Cl. A61l 3/00
U.S. Cl. 21—119                        6 Claims

ABSTRACT OF THE DISCLOSURE

A heater system for biological sterilization of large volume enclosed spaces and ventilation systems with dry formaldehyde gas. The heater system includes an enclosed housing which contains a heater element, a gas chamber and a reservoir. Control means permits paraformaldehyde flakes to be dropped from the reservoir onto a plate on the heater elements in order to form a gas from the flakes. The housing is provided with an inlet and outlet. A suction blower is connected with the outlet, and by drawing air in through the inlet, the generated gas is drawn out of the gas chamber and forced into any desired space by use of any suitable means such as an air conditioning, heating or ventilation duct system to which the outlet of the blower is secured.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is directed to biological sterilization and more particularly to a system for forming a biological sterilization gas and directing the gas to different compartments or large volume areas.

Heretofore, sterilization and fumigation by formaldehyde gas has been an accepted practice in the poultry industry. Methods for generating formaldehyde gas have included chemical reactions such as between potassium permanganate and aqueous formalin; evaporation of aqueous formalin from saturated cloth; and by depolymerization of paraformaldehyde with heat.

Formaldehyde gas produced by chemical reactions contains contaminating chemicals such as methanol or formic acid. Formaldehyde gas liberated by this method and by evaporation from open vessels or saturated cloth is a slow process in which uniformity of concentration throughout the chamber is difficult to achieve.

Formaldehyde gas generated by heating paraformaldehyde polymer is dry and pure. This process as described by Kaitz for poultry and egg fumigation (Pat. No. 2,993,832) provides for the production of specified concentrations of gas through heating weighed amounts of paraformaldehyde on an open hot surface located within incubation chambers. Equipment and procedures are suitable for small enclosed areas requiring depolymerization of small quantities of paraformaldehyde.

Present methods for disinfection with formaldehyde gas of large enclosed areas require the placement of several heating units such as electric frying pans or electric pot generators within the space for heating large quantities of paraformaldehyde. Electrical circuitry and individual electrical outlets limit the numbers of heating units that can be employed, hence limiting the quantity of formaldehyde gas being produced at a given time. In order to biologically decontaminate a large enclosed space, quantities of paraformaldehyde may be required that exceed the efficient capabilities of the electric frying pan or electric pot. Overloading of these units results in a significant loss in efficiency due to coalescence of the paraformaldehyde with formation of a vapor barrier at the heating surface. The open electric frying pan depolymerizes approximately 1.5 pounds of paraformaldehyde per hour. The electric pot generator converts approximately 3.0 pounds per hour. Both of these units must be located within the enclosed area and are not readily accessible to the attending operator. Both the electric pot generator and the electric frying pan are open to the atmosphere exposing the heating surfaces. Heat lost to the environment substantially reduces efficiency.

SUMMARY OF THE INVENTION

This invention is directed to a system for heating large quantities of paraformaldehyde flake to form a dry formaldehyde gas which is then directed into a remote area(s) for decontaminating the area. The system is useful with a duct-heating or air conditioning system which may be used to introduce the dry gas into desired areas. The gas forming device is outside of the area being treated so that the system may be observed by an operator. The system is also provided with a reservoir of paraformaldehyde flake so that the system may be used for as long a time as desired. Further, the heating element is contained within a housing so that the surrounding area is not affected by the heat.

STATEMENT OF THE OBJECTS

It is therefore an object of the present invention to efficiently generate dry formaldehyde gas from paraformaldehyde flake in high concentrations for rapid and controllable dissemination of the gas.

Another object is to provide an improved efficiency in biological sterilization of large volume enclosed spaces as well as ventilation systems.

Still another object is to provide a sterilization gas generating system which may be readily observed by an operator.

Yet another object is to provide a system which is able to produce a sterilization gas which is free of any contaminating chemicals.

While still another object is to provide a system which may produce a sterilization gas for long periods of time and may sterilize many separate areas by use of a single unit.

Other objects and advantages of the system will become obvious upon a more careful consideration of the following specification when taken together with the accompanying drawings.

BRIEF DESCRIPTION OF THE DRAWING

FIG. 1 illustrates a system including two generator/disseminator units connected to a single blower, with the units rotated to illustrate each of the sides and ends.

FIG. 2 is a cross-sectional view illustrating the relative parts of the generator.

FIG. 3 illustrates a movable section of the bottom of the reservoir and a scraper means used to aid in feeding flakes of paraformaldehyde through the bottom of the reservoir.

DETAILED DESCRIPTION OF THE SYSTEM

Now referring to the drawing, there is shown by illustration in FIG. 1, a system including two gas generating units 10 and an air blower unit 11 for withdrawing gases from the generators and blowing the gaseous sterilizing medium into a system for distribution into any desired area by any suitable duct system which leads into various desired large volume enclosed areas. Each of the generators are formed by an enclosed housing 12 having a reservoir section, a gas generating section and an area between the reservoir and gas generating section from which the generated gas is withdrawn from the housing.

The housing sides are formed by a single sheet of stainless steel or any other suitable material which is bent or formed into any suitable shape such as rectangular, as shown. The upper edges of the sides are cut at the corners and bent inwardly and secured together at their ends to form a flat surface 13 at the upper edges of the sides. The housing sides are provided with openings which form an air inlet 14, a gaseous medium outlet port 15, a lower access 16 with a hinged cover 51 through which any residue due to depolymerization of the flakes of paraformaldehyde may be cleaned, and two viewing ports 17 and 18, on opposite sides, if desired.

One side of the housing near the upper edge is provided with a hinge 21 to which a cover 22 is attached. The cover 22 is equiped with a carrying handle 52 and is provided with downwardly extending sides 23 which enclose the upper edges of the housing sides. A catch 24 is secured to the side of the cover opposite from the hinge which co-operates with a tensioning latch 25 secured to the housing to secure the cover in an air-tight fit with the housing. The inner surface of the cover which contacts the inwardly extending edges 13 of the housing is provided with a gasket lining 26 to insure a tight fit between the cover and the housing.

The sides of the housing are secured near the bottom thereof to the outer surface of a commercial type hot plate 31 which produces the controlled heat needed for gas generation. The hot plate is sufficiently large that the heating plate forms the bottom for the gas generator. The hot plate is also provided with a thermoregulator 32 in order to maintain a constant heating temperature.

The reservoir bottom is formed by two separate stainless steel sheets 33 and 34, one stationary and one movable, that cooperate to prevent the paraformaldehyde flake from dropping onto the heater until desired. One sheet is pan-like having sides 35 perpendicular to the main section. The sides of the sheet are secured to the sides of the housing in order to hold the stationary sheet in place. Directly below the stationary sheet, brackets 36 are secured to the housing sides. These brackets support the movable sheet such that the movable sheet is held close to the stationary sheet. The stationary sheet is provided with linearly aligned holes 37 of about ¾ inch therein through which the flake falls and the movable sheet is provided with parallel slots 38 of about ¾ inch in width spaced to align with the holes in the stationary sheet. The slots in the movable sheet are so arranged that when the movable sheet is inserted into the housing to its fullest extent, the sheet portion between the slots will align with the holes in the stationary sheet to prevent any flakes from falling through the holes and slots. The housing is provided with a slot through which the movable sheet is inserted into the housing and which permits inward and outward movement of the movable sheet. The stationary and movable plates form a slide feed mechanism for feeding flake onto the heater.

The reservoir is provided with a flake leveling and cleaning tool which is formed by a metal bar 40 secured to a rod 41. The housing is provided with a hole therein just above the stationary plate of the reservoir bottom in order to permit inward and outward motion of the leveling-cleaning tool.

The area of the housing bounding the gaseous paraformaldehyde area formed within the housing is lined with an asbestos mat 42 to prevent the heat from escaping from the area. The inner surface of the housing adjacent to the outlet port is provided with a baffle 43 to prevent any flake dropped from the reservoir from being drawn out through the outlet. The outlet port is provided with a housing 44 within which a filter 49 is placed to filter the gases as they are drawn from the chamber through nozzle 48 and out through a flexible metal attachment hose 53. The housing that encloses the filter is provided with a door 45 at the top which aids in replacing the filter without removing the outlet port housing.

In operation of the generator unit, the required quantity of paraformaldehyde polymer to be used is determined and weighed. With the slide feed mechanism in a closed position, the paraformaldehyde is placed in the reservoir section and spread evenly over the slide feed base by means of the leveling and cleaning tool. The upper access door, the lower access door and the air inlet port are closed. The flexible metal hose is attached to the filter-nozzle assembly and connected to the intake side of an air blower system. The heating unit is preheated to 500° F. and the hot plate thermoregulator is set to maintain this temperature. Upon attainment of the desired temperature, the blower system is activated and the air inlet port partially opened, the slide feed mechanism is rapidly opened and closed thereby allowing a portion of the reservoir contents to drop evenly over the heating surface. Rapid depolymerization occurs as the paraformaldehyde strikes the heating surface. The formaldehyde gas released by the process is drawn from the gas generating chamber through the filter nozzle assembly into the flexible metal hose and the air blower system. This procedure of feeding the flake into the heater is repeated at intervals as the paraformaldehyde on the heating surface is expanded. The process is observed through the viewing ports. To maintain even distribution of the reservoir contents over the surface of the slide feed base, periodic leveling is necessary. In the event an unusually large quantity of paraformaldehyde is required, the upper access door may be opened and the reservoir refilled repeatedly. However, the slide feed mechanism must be in the closed position and the blower in operation when recharging the reservoir. During operation, air entering through the air inlet port 14 mixes with the gas and passes out of the chamber through the outlet port 15 and the filter-nozzle assembly. The amount of air entering the inlet port is controlled by opening or closing the sliding cover 47 supported by slide brackets 46. Following expenditure of the paraformaldehyde, the heating unit is turned off and the generator disconnected from the blower system.

The gas generator/disseminator described herein provides a rapid and efficient means for producing the large quantities of formaldehyde gas required for large-scale space sterilization. In this generator the heating surface is enclosed in an insulated chamber thereby reducing heat loss to the environment. Seven to eight pounds of paraformaldehyde flake/powder may be deploymerized per hour. Location of the generator/disseminator outside the space to be sterilized permits continuous monitoring by an attendant. Preheating of the heating surface prior to its being charged with paraformaldehyde flake, as well as, the even deposition and flow of paraformaldehyde as regulated by the slide feed mechanism provide for rapid depolymerization without coalescence. The reservoir section allows for refilling of the unit without requiring the attendant to either enter the gas-filled spaces or to discontinue the operation of the system. This generator/disseminator unit is designed for use with air blowers which deliver the gas to the areas to be biologically sterilized. Movement of the gas from the generator chamber is dependent upon the negative pressure developed by attachment to the intake side of the blower. This arrangement provides for greater flexibility of use since the formaldehyde gas may be disseminated in an area close by or far distant from the location of the generator and its operator. The generator may be connected to a portable air blower system or to air ventilation/conditioning systems. Dissemination of the gas via a blower system provides more rapid uniformity of concentration throughout large spaces than can be achieved under static conditions. The dissemination rate may be controlled by varying the deposition of paraformaldehyde on the heating surface, the temperature and size of the heating surface, and the speed of the blower and two or more generators may be attached in parallel to the same blower.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A system for generating and disseminating gaseous formaldehyde from paraformaldehyde flakes; which comprises, a housing, said housing including a reservoir compartment in the upper portion thereof across the entire cross-section thereof for holding said paraformaldehyde flakes, a gaseous formaldehyde chamber below said reservoir bounded by said housing, and a heater in a heating section below said chamber for rapid depolymerization of said flakes, said heater extending entirely across the area confined by said housing, said reservoir containing a bottom bounded by said housing including a stationary section and a movable section operable relative to said stationary section to selectively permit paraformaldehyde flakes to pass through the bottom and to drop onto said heater, said stationary section of said reservoir bottom including linearly aligned spaced apertures therein extending substantially across the width thereof, said movable section of said reservoir bottom including linear slots therein spaced from each other, said slots spaced to align with said apertures in one position and to lie between said apertures in another position, said chamber having an air inlet on one side and a gaseous formaldehyde outlet on the opposite side, said heating section including a heating means capable of maintaining a desired temperature for depolymerization of said formaldehyde flakes as said flakes are dropped onto said heater.

2. A system as claimed in claim 1, which includes:

a scraper means in the bottom of said reservoir operative relative to said reservoir bottom to assist in dropping said flakes through said reservoir bottom.

3. A system as claimed in claim 2, in which:

said air inlet is adjustable to control the amount of air entering into said housing.

4. A system as claimed in claim 3, which includes:

an air blower means for exhausting gaseous formaldehyde from said gas chamber via said outlet and distributing said gases through a distribution system into large volume areas.

5. A system as claimed in claim 4, in which:

said housing includes an air light lid which may be opened for replenishing said flakes of paraformaldehyde.

6. A system as claimed in claim 5, which includes:

a door in said housing near said heating means through which said heating means may be cleaned of any residue due to depolymerization of said flakes of paraformaldehyde.

References Cited

UNITED STATES PATENTS

| | | | |
|---|---|---|---|
| 761,122 | 5/1904 | Wilson | 21—117 |
| 1,400,598 | 12/1921 | Fowler | 21—117 X |
| 1,811,191 | 6/1931 | Taylor | 21—119 UX |
| 1,910,722 | 5/1933 | Timmis et al. | 21—110 |
| 2,758,412 | 8/1956 | Loibl | 43—125 |
| 2,937,419 | 5/1960 | Vaughn | 21—117 X |
| 2,993,832 | 7/1961 | Kaitz | 21—58 X |
| 3,290,112 | 12/1966 | Gillenwater | 21—110 |

BARRY S. RICHMAN, Primary Examiner

U.S. Cl. X.R.

21—58, 110, 117; 23—281; 43—125, 129